(12) United States Patent
Jantunen et al.

(10) Patent No.: US 11,192,761 B2
(45) Date of Patent: Dec. 7, 2021

(54) BRAKE CONDITION MONITORING

(71) Applicant: KONECRANES GLOBAL CORPORATION, Hyvinkää (FI)

(72) Inventors: Aapo Jantunen, Hyvinkää (FI); Janne Salomäki, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 284 days.

(21) Appl. No.: 15/778,737

(22) PCT Filed: Nov. 23, 2016

(86) PCT No.: PCT/FI2016/050823
§ 371 (c)(1),
(2) Date: May 24, 2018

(87) PCT Pub. No.: WO2017/089652
PCT Pub. Date: Jun. 1, 2017

(65) Prior Publication Data
US 2018/0354757 A1     Dec. 13, 2018

(30) Foreign Application Priority Data
Nov. 25, 2015 (FI) ................................ 20155873

(51) Int. Cl.
*B60T 17/22*     (2006.01)
*B66C 15/00*     (2006.01)
(Continued)

(52) U.S. Cl.
CPC .............. *B66C 13/23* (2013.01); *B60T 17/22* (2013.01); *B66C 15/00* (2013.01); *B66C 15/02* (2013.01);
(Continued)

(58) Field of Classification Search
CPC ......... B66C 13/23; B66C 13/16; B66C 15/00; B60T 17/22; F16D 66/024; F16D 66/027; B66D 1/14
See application file for complete search history.

(56) References Cited

U.S. PATENT DOCUMENTS 6,206,149 B1 *  3/2001  Heidenreich ....... F16D 55/2245
                                              188/1.11 W
6,366,199 B1 *  4/2002  Osborn .............. B60H 1/00585
                                              340/438
(Continued)

FOREIGN PATENT DOCUMENTS

CN        1446158 A      10/2003
CN      102792016 A      11/2012
(Continued)

OTHER PUBLICATIONS

Extended European Search Report for European Application No. 16868081.7, dated Jun. 28, 2019.
(Continued)

*Primary Examiner* — Robert A. Siconolfi
*Assistant Examiner* — James K Hsiao
(74) *Attorney, Agent, or Firm* — Birch, Stewart, Kolasch & Birch, LLP

(57) ABSTRACT

A brake is operationally coupled by gear engagement to an axle of a device, whereby turning on the brake prevents the axle from rotating. Monitoring condition of the brake includes driving the axle of the device in a first rotation direction when the brake has been turned on. The axle of the device is driven in a second rotation direction when the brake has been turned on. A first position angle of the axle of the device, which follows from driving the axle of the device in the first rotation direction, is measured. A second position angle of the axle of the device, which follows from driving the axle of the device in the second rotation direc-
(Continued)

tion, is measured. A clearance of the gear engagement of the brake is determined on the basis of a difference of the first and the second position angles.

19 Claims, 2 Drawing Sheets

(51) Int. Cl.
  *B66C 13/23*  (2006.01)
  *B66D 1/14*  (2006.01)
  *B66C 15/02*  (2006.01)
  *F16D 66/02*  (2006.01)
  *B66C 13/16*  (2006.01)
  *F16D 66/00*  (2006.01)

(52) U.S. Cl.
  CPC ............ *B66D 1/14* (2013.01); *F16D 66/024* (2013.01); *F16D 66/027* (2013.01); *B66C 13/16* (2013.01); *F16D 2066/003* (2013.01)

(56) References Cited

U.S. PATENT DOCUMENTS

| | | | | |
|---|---|---|---|---|
| 6,659,233 B2 * | 12/2003 | DeVlieg | ............... | B60T 8/1703 188/1.11 E |
| 7,457,785 B1 * | 11/2008 | Greitzer | ................... | G01D 1/18 706/12 |
| 7,877,216 B2 * | 1/2011 | Wright | ................... | F16D 66/02 188/1.11 E |
| 9,404,806 B2 * | 8/2016 | Miller | ...................... | G01K 3/04 |
| 10,006,441 B2 * | 6/2018 | Schindele | ............. | F03D 7/0296 |
| 2003/0125863 A1 * | 7/2003 | Tamasho | ............... | B60T 13/741 701/70 |
| 2004/0011596 A1 * | 1/2004 | Miller | ..................... | B64C 25/42 188/1.11 W |
| 2008/0071432 A1 * | 3/2008 | Devlieg | ................ | B64C 25/426 701/3 |
| 2012/0025526 A1 * | 2/2012 | Luo | .......................... | F03D 80/70 290/44 |
| 2013/0008242 A1 * | 1/2013 | Sakaguchi | ............. | F03D 15/00 73/112.01 |
| 2015/0047426 A1 * | 2/2015 | Ekholm | ................... | B66D 5/02 73/121 |
| 2016/0298604 A1 * | 10/2016 | Guern | ..................... | F16F 13/08 |

FOREIGN PATENT DOCUMENTS

| | | |
|---|---|---|
| GB | 1 410 259 A | 10/1975 |
| JP | 58-143210 A | 8/1983 |
| JP | 2008-213966 A | 9/2008 |
| JP | 2010-107361 A | 5/2010 |
| JP | 2012-149919 A | 8/2012 |

OTHER PUBLICATIONS

International Search Report for PCT/FI2016/050823 (PCT/ISA/210) dated Mar. 1, 2017.
Written Opinion of the International Searching Authority for PCT/FI2016/050823 (PCT/ISA/237) dated Mar. 1, 2017.
Chinese Office Action and Search Report for Chinese Application No. 201680077045.6, dated Dec. 2, 2019, with an English translation.

* cited by examiner

BRAKE CONDITION MONITORING

BACKGROUND OF THE INVENTION

The invention relates to monitoring condition of a brake.

Brakes used in hoisting devices are critical to the operation of the hoisting device both in terms of economy and safety. The malfunction of a brake may lead to dropping the load, whereby other parts of the hoisting device may be damaged and there is a risk that the persons working close by will get hurt.

Conventionally, brakes used in hoisting devices are electro-magnetic disc brakes wherein a brake disc rotating along with a motor axle and containing friction surfaces is pressed against an anchor plate, whereupon deceleration takes place. The motor axle and the brake disc are interconnected via gear engagement, whereby when the motor rotates the brake disc rotates along with the axle. Upon braking, the brake disc resists the rotation of the axle and thus stops the rotation of the axle.

In connection with every braking event, transmission of a deceleration force from the brake on to the axle of the motor takes place between the gear engagement of the motor and the toothing of the brake disc. The deceleration force wears down the toothings of the motor and the brake disc, which causes a clearance in the gear engagement connecting the motor axle and the brake disc. The gear engagement is allowed some brake-specific amount of wear when it is still safe to use the brake, but exceeding this limit will compromise safe operation of the hoisting device. A gear engagement worn too much may cause the load to drop.

BRIEF DESCRIPTION OF THE INVENTION

An object of the invention is thus to provide a method, an apparatus implementing the method and a computer program so as to enable the aforementioned problems to be solved. The object of the invention is achieved by a method, apparatus and computer program which are characterized by what is stated in the independent claims. Preferred embodiments of the invention are disclosed in the dependent claims.

An advantage of some embodiments of the invention is that the clearance of the brake may be determined without opening the brake.

BRIEF DESCRIPTION OF FIGURES

The invention is now described in closer detail in connection with the preferred embodiments and with reference to the accompanying drawings, in which like reference numerals identify like elements.

DETAILED DESCRIPTION OF THE INVENTION

The following describes the monitoring of the condition of a brake. By monitoring the condition of a brake, it is possible to obtain information on the condition of the brake so as to enable maintenance work of the brake to be scheduled before malfunction of the brake occurs. When a brake is malfunctioning, its braking power may be reduced. A reduction in the braking power may be caused by a clearance between the brake and an axle.

The monitoring of the condition of the brake enables information on the impaired condition of the brake to be obtained so that the brake can be subjected to predictive maintenance work on the basis of the actual condition of the brake. The actual condition of the brake can be determined by comparing the clearance with one or more limit values. The limit values may determine one or more brake condition levels, in which case the condition of the brake can be determined by comparing the clearance with the limit values. If the clearance is within one or more limit values corresponding to a particular condition level, the condition of the brake may be determined to correspond to this particular condition level. The best condition level of the brake may be determined when the clearance is within one or more limit values corresponding to the best condition level. If the condition level of the brake does not correspond to the best condition level, the condition level of the brake may be compared, by proceeding sequentially in due order, with one or more lower condition levels, in which case the condition level within whose one or more limit values the clearance of the brake is can be determined to be the condition level of the brake. Such brake condition levels may include: "new", "worn", "in need of maintenance", and "unserviceable". The condition of a brake is impaired when the condition level is not "new", which may correspond to the best condition level. When the brake condition level is "unserviceable", it is out of order. Between the condition levels "new" and "unserviceable", the performance of the brake has impaired such that at the condition level "worn", the condition of the brake is better than at the condition level "in need of maintenance".

Figure 1A:
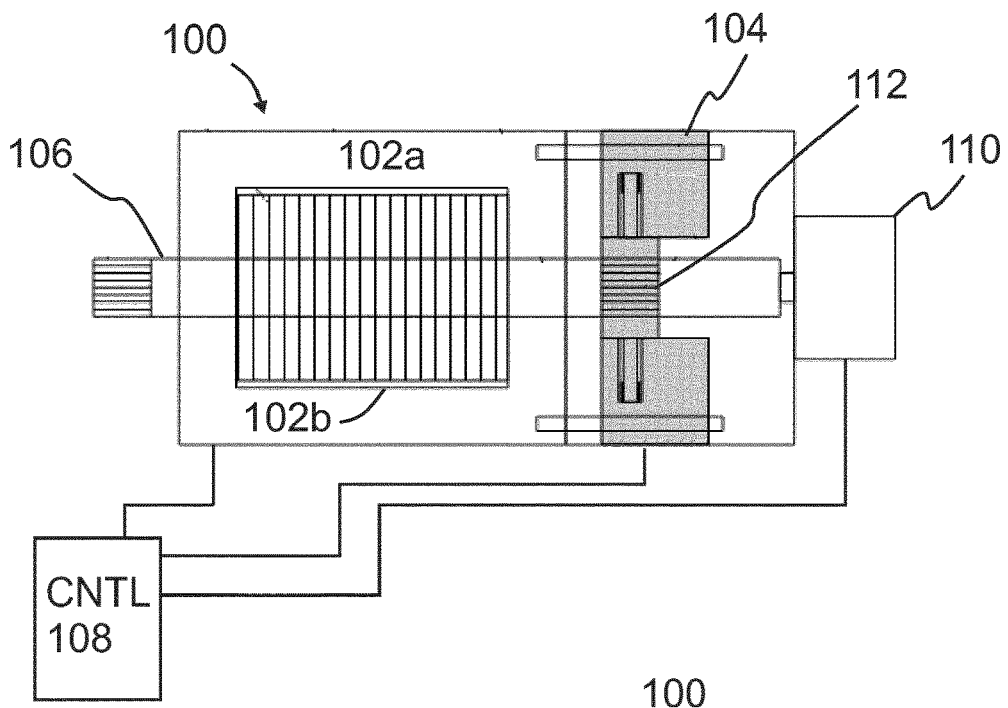
FIG. 1a shows an example of an apparatus wherein a brake is operationally coupled to an axle of a device.

FIG. 1a shows an example of an apparatus 100 wherein a brake 104 is operationally coupled via a gear engagement to an axle 106 of a device. The axle is rotatable in two different directions. Thus, turning the brake on will prevent the axle from rotating. The brake may be for instance a brake conventionally used in hoisting devices. The apparatus is provided with a control 108 "CNTL" coupled to the device and the brake so as to enable the rotation of the axle and the brake to be controlled; further, the control also enables information to be obtained for determining a position angle of the axle. The use of the axle and the brake may be implemented by means of the control.

When the brake has been turned on, the brake can be said to be closed. When the brake is off, the brake can be said to be open. The brake can be opened when it is supplied with current. Similarly, the brake can be closed when the supply of electric current is switched off.

The coupling between the axle and the brake may be implemented by a connecting part 112 provided with toothing, the rotation of the axle then engaging with the brake via the toothing. The connecting part may be integral to the brake. The connecting part enables the turning on and/or off the brake to be coupled with the axle, allowing the operation of the brake to be transmitted to the axle. It is also possible to implement the brake without a separate connecting part, in which case the brake disc may be provided with toothing to engage with the axle.

The rotation of the axle may be achieved in many different ways. The axle may for instance be part of an electric motor provided with a rotor 102b and a stator 102a. The rotor of the electric motor may be arranged on the axle such that the supply of electric current to the stator makes the rotor rotate and thus also the axle fastened to the rotor rotate.

The axle may be provided with an encoder 110 coupled thereto to provide information on the position angle of the axle. Such information on the position angle of the axle may be transferred to the control wherein the information may be processed in order to determine a clearance of the gear engagement of the brake. The encoder may be fastened to either end of the axle, aligned with the centre of the axle. The frame of the encoder is fastened to the non-rotating structure, such as a motor frame, while the rotating part of the encoder is fastened to the axle.

The encoder may be any device capable of producing information on the position angle of the axle. The information on the position angle of the axle may be relative information or absolute information. The absolute information produced by the encoder on the position angle may indicate a value of the position angle of the axle in degrees, for instance. The relative information produced by the encoder on the position angle may indicate a change in the position angle of the axle with respect to a previous position angle. The change in the position angle of the axle with respect to the previous position angle may be indicated in degrees or in percentages.

An example of an encoder is a pulse sensor. The pulse sensor may be used for producing relative information on the position angle of the axle and for calculating the position angle of the axle on the basis of the number of pulses caused by rotation. The pulse sensor generates pulses, and each pulse may correspond to a change in the position angle of the axle for instance in degrees, in which case the number of pulses generated by the pulse sensor indicates a change in the position angle of the axle with respect to a starting situation. The number of pulses may be calculated for instance while measuring the position angle.

The pulse sensor may be single-channel or double-channel. A single channel pulse sensor may produce 1200 pulses per axle turn. The pulse sensor may be double-channel, in which case the pulse sensor may produce in each channel 600 pulses per axle turn such that the channels have a mutual phase shift of 90 degrees.

An incremental sensor is a pulse sensor with an optical device that measures the angle of rotation. The incremental sensor may transmit through a pulse disc for instance LED (light emitting diode) light that a receiving diode collects. The pulse disc has translucent and opaque lines at regular intervals and it rotates on the axle of the device being measured. As light hits a translucent line, the diode collects the light and forms it into a pulse that is transformed into a square wave. When the time between the pulses and the distance between the lines in the pulse disc are known, it is possible to determine the rotation speed of the axle on the basis of time. With the pulse intervals, it is also possible to determine the rotating position as long as the initial position is known. The rotation direction is also known if the pulse disc has two translucent line circles. Each line circle may thus be used for generating pulses in one channel. A pulse sensor with one translucent line circle is single-channel while a pulse sensor with two translucent line circles is double-channel. The rotation direction of the axle can be inferred from pulses generated by different line circles on the basis of which one of the channels is the one to first receive a pulse upon starting to drive the axle. Consequently, a change in the direction of the axle can be determined if the channel from which the pulse is received first after starting to drive the axle has changed with respect to a previous event of starting to drive the axle.

An absolute sensor is a pulse sensor of another type, enabling, correspondingly, rotation to be measured. As distinct from the pulse sensor, such as the incremental sensor, the absolute sensor provides constantly precise position information. In an absolute sensor, the pulse disc has multi-bit individual positional information for each position. This requires more light emitting diodes (LED) and receiving diodes so as to enable the binary code to be read.

The connections in the apparatus may be implemented as electrical connections via which electric current is supplied to control the device and/or the brake. The control of the device and the brake may comprise for instance turning electric current on and off, and/or adjusting the frequency of electric current. The electric current may be alternating current or direct current. Information may be transmitted through one or more data transfer connections, for instance by fieldbuses of an automation system.

Figure 1B:
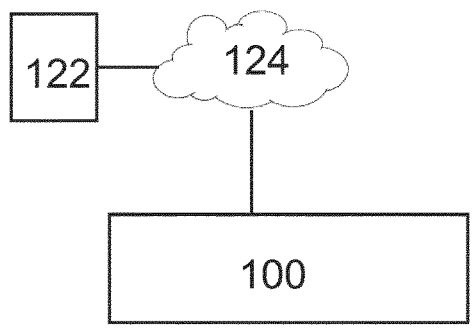
FIG. 1b shows an example of a system for remote-controllable brake condition monitoring.

FIG. 1b shows an example of a system for remote-controllable brake condition monitoring. The system enables the brake condition monitoring to be implemented remote-controllably. The brake may be provided in the apparatus 100 shown in FIG. 1a. A condition monitoring centre 122 may be connected to the apparatus to obtain information which indicates the condition of a brake coupled to a device. The condition monitoring centre may be a computer or a server. The condition monitoring centre may maintain information on pieces of information, such as condition, concerning one or more brakes. The connection between the condition monitoring centre and the apparatus may be a telecommunication connection, for instance via the Internet 124 or a corresponding network. In an example, the telecommunication connection may be implemented between the control of the apparatus and the condition monitoring centre by providing the condition monitoring centre and the control with necessary connection means. Examples of connection means comprise data transfer modules and modems. The connection between the condition monitoring centre and the apparatus may be completely or in part a wireless connection, such as a data connection of a mobile network or a wireless local area network connection based on the IEEE 802.11 protocol family. Wired connections may also be utilized between the condition monitoring centre and the apparatus. Remote control may thus be possible from short distances, for instance within the coverage of a wireless local area network, or at long distances where the condition monitoring centre is located outside the coverage of a single wireless local area network, for instance at a distance of several kilometres. The telecommunication connection may thus include one or several data transfer links, in one or more networks.

The information indicating the condition of a brake coupled to a device may comprise information on the position angle of the axle and/or information on a clearance of the gear engagement of a brake. The information may include a time stamp or it may be provided with a time stamp in the condition monitoring centre, in which case the information and further the condition of the brake may be connected with a particular moment in time. The condition monitoring centre may store information obtained on the device.

In an embodiment, the condition monitoring centre may carry out brake condition monitoring remote-controllably. In such a case, the condition monitoring centre executes in the apparatus a method for brake condition monitoring to provide information indicating the condition of the brake coupled to the device. In remote control, the condition monitoring centre may establish a connection to the apparatus and send a command to provide a method for brake condition monitoring.

Figure 2:
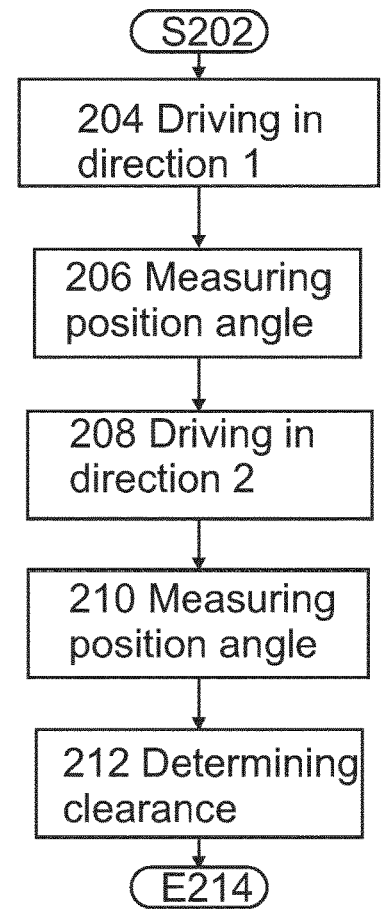
FIG. 2 shows a method according to an embodiment.

FIG. 2 shows a method according to an embodiment. The method comprises monitoring condition of a brake, the brake being operationally coupled by gear engagement to an axle of a device. FIG. 1a shows an example of a brake used in the method and an apparatus in which the method may be executed. The method may start 202 when the brake has been coupled to the device, the brake can be turned on, and the axle of the device may be rotated.

The method comprises driving 204 the axle of the device in a first rotation direction when the brake has been turned on.

A position angle of the device is measured 206. The position angle may be measured as an absolute value or as a relative value. The position angle may be in degrees or in radians. The position angle may be measured for instance by an encoder, such as an incremental sensor, as a relative measurement or by an absolute sensor as an absolute measurement. As an example of an absolute measurement of a position angle, the position angle of the axle may be registered in a starting situation, before the axle of the device is driven in the first rotation direction. When the driving of the axle in the first direction ends, a new position angle may be registered. As an example of a relative measurement of a position angle, a change in the position angle of an axle from a moment at which the driving of the axle started to a moment at which the driving of the axle ends may be registered. When the driving of the axle in the first direction ends, the axle is in its extreme position.

The method comprises driving 208 the axle of the device in a second rotation direction when the brake has been turned on. The rotation direction of the axle is thus reversed in relation to the direction in which the axle is first driven 204. The position angle of the axle of the device may be measured 210 in the second rotation direction, as described above in step 206 in the first rotation direction. Measurement 206, 210 of the position angles of the axle is thus carried out at the same time as the axle is rotated and the brake has been turned on, enabling the changes in the position angle to be detected for the purpose of monitoring the condition of the brake. Depending on the manner of measurement of the position angles, the measurement does not have to be continuous, but continuous measurement is advisable in order to ensure accuracy of measurement.

Preferably, the brake is turned on for the purpose of driving 204 the axle, and the brake is not opened when the rotation direction of the axle is reversed. The brake thus stays on all the time while measuring 206, 210 the positions angles. Consequently, the measuring time does not increase due to using, for instance turning off and/or on, the brake.

A clearance of the gear engagement of the brake is determined 212 on the basis of a difference of the measured position angles. The clearance may be determined by comparing the difference of the position angles with default values or values of a new brake. The clearance may be determined after the measurement results have been obtained. When the clearance is determined on the basis of the absolute values of the position angles, registering the position angle in the starting situation is not necessary but the clearance may be calculated from the extreme positions of the position angles of the axle in both driving directions of the axle. When the clearance is determined by the relative measurement of the position angle, the difference of the position angles can be obtained by measuring a change in the position angle of the axle between the extreme positions of the axle.

The method may end 214 when the clearance of the brake has been determined. The clearance of the brake enables the condition level of the brake to be determined by comparing the clearance with one or more limit values. The limit values may correspond to different condition levels of the brake, such as "new", "worn", "in need of maintenance", and "unserviceable".

In an embodiment, the device is provided with operating parameters for brake condition monitoring. Thus, when carrying out brake condition monitoring, particular operating parameters are used that are not used in normal operation of a device.

Such operating parameters for brake condition monitoring enable the brake condition monitoring, for instance steps of FIG. 2, to be repeated substantially the same, whereby it is possible to compare pieces of information obtained in the condition monitoring with one another. The operating parameters may comprise at least one of the following: operating time, torque, for instance 20%, and rotation speed, for instance 5%. The operating time may determine for instance a time value for driving the axle in a selected rotation direction. The torque and the rotation speed may also be used as limit values within which the brake condition monitoring is carried out. Relative values for the parameters may be calculated from the nominal values of the device for the parameters in question.

Figure 3:
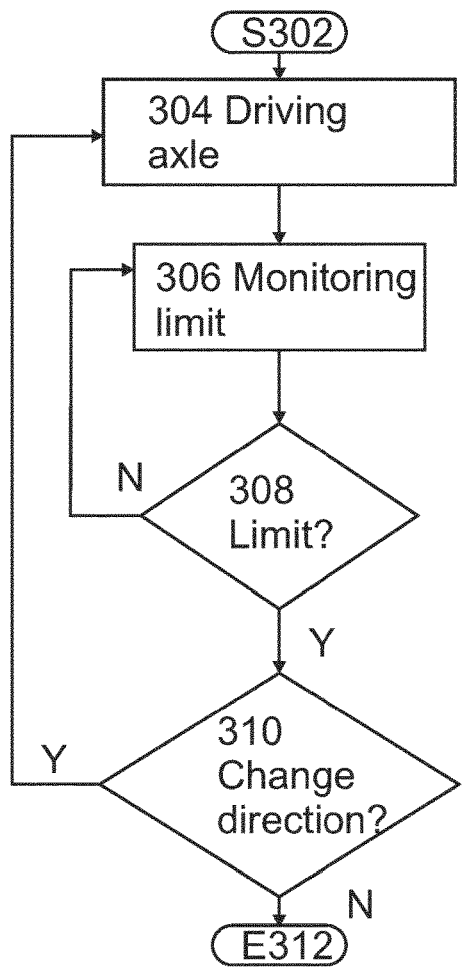
FIG. 3 shows a method according to an embodiment.

FIG. 3 shows a method according to an embodiment. The method comprises monitoring condition of a brake, the brake being operationally coupled by gear engagement to an axle of a device. FIG. 1a shows an example of a brake used in the method and an apparatus in which the method may be executed. The method may start 302 when the brake has been coupled to the device, the brake can be turned on, and the axle of the device may be rotated. The method comprises driving 304 the axle of the device when the brake has been turned on. The axle of the brake can be driven in either possible direction of rotation of the axle. The position angle of the axle may be measured, as described in connection with the steps 206 and 210 of the method of FIG. 2.

In an embodiment, the measurements may include determining a change in the rotation direction of the axle when a double-channel incremental sensor is used for measuring the position angle. In such a case, a change in the direction of the axle may be determined if sequential pulse edges are received from one channel during the time between which no single pulse edge is received in the other channel. This is illustrated below in FIG. 4.

One or more limits may be set for driving the axle in a selected rotation direction. The set limits may be monitored 306. Upon 308 reaching the set limits, driving the axle in the selected rotation direction may be stopped 312. This enables excessive driving against the brake to be prevented. If not one set limit has been reached, the monitoring 306 of the limits may be continued when the axle is driven in the selected rotation direction. Preferably, the monitoring is continued until all set limits have been reached.

If 310 the axle has not been driven in both rotation directions in order to measure the position angle, the axle may be driven 304 in a rotation direction opposite to the previous rotation direction of the axle. This enables the measurement of the position angle to be carried out in a second rotation direction, as described in steps 208 and 210 of the method of FIG. 2. If 310 the axle has been driven in both rotation directions in order to measure the position angles, such as after steps 208 and 210 of FIG. 2, the method may end 312 and the driving of the axle may be stopped.

In addition to a single limit, several limits may be used together, in which case driving the axle in the selected rotation direction may be stopped only after reaching all limits. The operating parameters or values derived from the operating parameters for brake condition monitoring may be used as limits. This enables the limits to be monitored on the basis of the data used in the monitoring of the operating parameters. The data used in the monitoring of the operating parameters may be obtained for instance by sensors producing measurement results from the quantities of the operating parameters.

As an example of using the operation time as a limit, the position angle of the axle may be measured when the axle has been rotated in the selected rotation direction for a duration of time corresponding to the operation time.

As an example of using a torque as a limit, the position angle of the axle may be measured when the torque of the axle reaches the limit of the torque determined in the operating parameters.

As an example of using a rotation speed as a limit, the position angle of the axle may be measured when the rotation speed of the axle differs from the rotation speed determined by the operating parameters. It is thus possible to derive a limit value for the rotation speed from the rotation speed or for the difference of the rotation speed from the rotation speed set as an operating parameter. The limit value of the rotation speed may be for instance zero degree/s.

In an embodiment, the brake condition monitoring determines that the brake is malfunctioning. The malfunction of the brake may be determined when the axle is driven 304 and the limits set for driving the axle are not reached within the determined time, for instance within the operation time set as an operating parameter. If within the determined time one or more or all other limits are not reached, the brake can be considered to be malfunctioning. The malfunction of the brake may indicate for instance slipping of the brake if the speed is higher than zero degree/s after a determined time.

Figure 4:
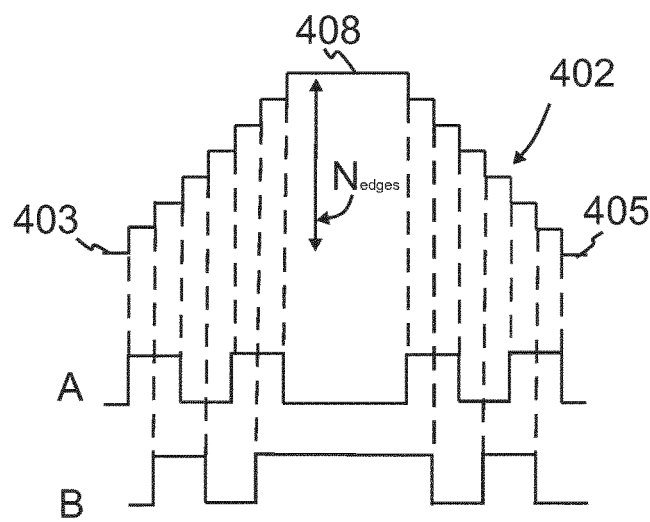
FIG. 4 shows measurement results in the brake condition monitoring according to an embodiment.

FIG. 4 shows measurement results in brake condition monitoring according to an embodiment. The brake condition monitoring may be carried out for instance by the method described in connection with FIG. 2. The measurement results show the position angle 402 of the axle as a function of time "t". In FIG. 4, pulses A and B received from the channels of a double-channel pulse sensor are shown below the position angle. The position angle may be formed by means of ascending and descending edges of the received pulses, which is illustrated in broken lines.

When the axle is driven in a second rotation direction, the pulse sensor generates pulses indicating a change in the position angle of the axle with respect to a starting situation 403. The change in the position angle indicated by the received pulses is added to the starting situation, in which case the position angle increases. The change in the position angle may be detected from the ascending and descending edges of the pulses. The end of the rotation of the axle may be detected as a uniform portion 408 after an ascending portion of the position angle. The axle has then reached its extreme position. Next, the axle is driven in the opposite rotation direction, in which case the change in the position angle indicated by the received pulses lowers the value of the position angle. As above, the change in the position angle may be detected from the ascending and descending edges of the pulses. The clearance of the gear engagement of the brake may be calculated from the number $N_{edges}$ of edges of the pulses when the axle is rotated from the extreme position to an end situation 405, in which the axle has stopped and the extreme position of the axle in the opposite rotation direction has been reached. If the resolution of the pulse sensor is 0.15 degrees/pulse, a change of the position angle is $\frac{1}{4}*0.15*N_{edges}$ degrees.

In an embodiment, a change in the direction of the axle may be determined if sequential pulse edges are received from one channel during the time between which no single pulse edge is received in the other channel. This is illustrated in FIG. 4, where first in channel A a descending edge of the pulse is detected before the uniform portion 408 of the position angle and next an ascending edge of the pulse is detected before in channel B a descending edge is detected.

In an embodiment, the brake is prevented from being opened while the condition of the brake is being monitored. In such a case, no brake opening commands can be given from the control to the brake. Opening commands may be given for instance by a user interface connected to a device, the user interface comprising a user interface component which, when selected by a user, causes the brake to open. Selecting the user interface component may thus cause an opening command to be sent to the brake if the condition of the brake is not being monitored. The user interface may further be provided with a user interface component for closing the brake which, when selected by the user, causes the brake to close. Selecting such a user interface component may cause for instance a closing command to be sent to the brake. On the other hand, the brake opening and closing functions may be implemented by one user interface component, wherein selecting the user interface component causes the brake to be alternately closed and opened. Consequently, the same user interface component may be used for opening a closed brake as well as for closing an opened brake. Selecting the user interface component during the brake condition monitoring may be prevented, or a function caused by the user interface component, such as sending the opening command, may be prevented during the brake condition monitoring. Such prevention actions may be implemented by software, in which case the selection of the user interface component is not received or the function caused by the selection of the user interface component is not executed.

Examples of user interface components comprise icons, keyboard, push-buttons and keys. The user interface components may be implemented by means of a display. The display may be a touch screen, in which case selections made by the user may be received by means of the screen. On the other hand, the display, including the touch screen, may be accessible through computer accessories, such as a keyboard and a mouse. The user interface components, such as push-buttons, may be further implemented by means of electrical switches, as is common in the controls of hoisting devices.

In an embodiment, the condition of a brake is monitored at determined time intervals. The time intervals may be determined locally in the control 108 of a device, or the time intervals may be determined in the condition monitoring centre 122. An advantage of the local determination is that the condition monitoring may be carried out when most convenient with respect to the locally changing conditions, such as a work load of a device. An advantage of the time intervals determined by the condition monitoring centre is that the time intervals may be determined on the basis of condition monitoring data received from a plurality of brakes. The condition monitoring centre may thus be in contact with a plurality of apparatuses provided with a brake whose condition may be monitored, for instance as described in connection with FIGS. 1a and 1b. The condition monitoring data received from the brakes may be analyzed in the condition monitoring centre, and a time interval to be followed in the brake condition monitoring may be determined for all brakes or a certain brake type.

In an embodiment, the brake condition monitoring may be carried out during measurement time, which is determined from one or more previously performed brake condition monitorings in which the clearance has been determined. The measurement time may determine one or more time instants for measurement. One or more previously performed condition monitorings may provide information on the size of each clearance and on the determination moment of each clearance. A change in the size of a clearance as a function of time may be inferred from the previous brake condition monitorings, in which case the moment for the next brake condition monitoring may be predicted to correspond to the probable need to monitor the condition of the brake. This enables the brake condition monitoring occasions to be scheduled to take place as necessary, in which case the effect of the condition monitoring on the operation of the device may be kept small.

It is to be noted that it is possible to combine service data of the device with data obtained from the brake condition monitoring. Such service data of the device may be obtained for instance from a control controlling the device and/or from an encoder as well. The service data of the device may be collected over a period of time during which the device is used by parameters other than the brake condition monitoring parameters. Examples of such device service data comprise service hours and the number of rotational rounds of an axle.

An embodiment relates to an apparatus 100 comprising a device and a brake 104 operationally coupled by gear engagement to the axle 106 thereof, whereby turning on the brake prevents the axle from rotating, and a control connected to the brake and the device for providing functions according to any one of the embodiments.

An embodiment comprises a computer program comprising a program code which, when executed on a computer, executes functions according to any of the embodiments described above. The computer program may be included in a computer-readable storage medium, for instance in a non-volatile memory.

An embodiment comprises a computer program product comprising a computer program according to an embodiment for executing functions according to any of the embodiments described above.

In an embodiment, the device may be a hoisting device. The hoisting device may be part of an apparatus 100, for instance a load handling device, such as a crane. The crane may be a container crane, gantry crane, straddle carrier, bridge crane or a port crane.

In an embodiment, the control may be a frequency converter which may be coupled to the device and the brake so as to enable the rotation of the axle and the brake to be controlled; the control also enables information to be obtained for determining a position angle of the axle. The frequency converter may supply the brake and the device with operating voltage as alternating current. The frequency converter may set the properties, such as frequency, of operating voltages to be supplied to the device and the brake such that the device and the brake are used according to the desired parameters. The frequency converter may thus convert the frequency and voltage of the alternating current. The desired parameters comprise for instance the operation time, rotation speed and torque of the axle. For condition monitoring, special parameters may be determined. The operation of the device and the brake may also be controlled by turning the operating voltage on and off. For instance, the brake may be opened when the brake is being supplied with operating voltage. The brake may be closed when the operating voltage is cut off.

In an embodiment, the apparatus comprises sensors arranged to measure parts of the apparatus subjected to the operating parameters in order to monitor the operating parameters. The sensors may produce for instance time information, torque information and speed information.

In an embodiment, the apparatus comprises processing means configured to execute functions described in an embodiment. The processing means may serve as a computer for executing the program code. The processing means may comprise at least one processor, memory and program platform capable of executing the program code.

The embodiments can be implemented as a computer process that is defined by a computer program. The computer program may be in source code format, object code format or an intermediate format, and the computer program can be stored on a storage medium that may be any piece or apparatus that is capable of storing the computer program. For instance, a computer program can be stored on a computer program distribution medium that can be read by a computer or processor. The computer program distribution medium may comprise a storage medium, computer memory, read-only memory (ROM), electric carrier wave, telecommunications signal, and software distribution package, for instance.

A person skilled in the art will find it obvious that, as technology advances, the basic idea of the invention may be implemented in many different ways. The invention and its embodiments are thus not restricted to the above-described examples but may vary within the scope of the claims.

The invention claimed is:

1. A method for monitoring a condition of a brake, the brake being operationally coupled by gear engagement to an axle of a device, whereby turning on the brake prevents the axle from rotating,
    wherein the brake is controlled by a control,
    wherein an encoder is coupled to the axle and a frame of the encoder is fastened to a motor frame, and
    wherein the encoder is a pulse sensor that is an incremental sensor,
    the method comprising:
    driving the axle of the device in a first rotation direction when the brake has been turned on, wherein a plurality of limits is set for driving the axle in the first direction and stopping the driving after reaching the plurality of limits;
    driving the axle of the device in a second rotation direction when the brake has been turned on, wherein the plurality of limits is set for driving the axle in the second direction and stopping the driving after reaching the plurality of limits;
    measuring a first position angle of the axle of the device, which follows from driving the axle of the device in the first rotation direction, and a second position angle of the axle of the device, which follows from driving the axle of the device in the second rotation direction, wherein the first and the second position angles are measured by the encoder, and
    determining a clearance of the gear engagement of the brake on the basis of a difference of the first and the second position angles and based on if the plurality of limits set for driving the axle are reached within a determined time, wherein the device is provided with operating parameters for monitoring the condition of the brake, including torque of the axle, and the step of measuring the first position angle and the second position angle of the axle of the device is performed when the torque of the axle reaches a predetermined limit.

2. The method as claimed in claim 1, wherein the operating parameters or values derived from the operating parameters are used as limits, and the driving of the axle is stopped or the rotation direction is changed if at least one of the limits is reached.

3. The method as claimed in claim 2, wherein the brake is determined to be malfunctioning if within a determined period of time one or more or all limits are not reached.

4. A computer program product embodied on a non-transitory computer readable medium and comprising a program code which, when executed on a computer, executes the method according to claim 2.

5. The method as claimed in claim 1, wherein the operating parameters further comprise rotation speed.

6. The method as claimed in claim 1, wherein the brake is prevented from being opened while the condition of the brake is being monitored.

7. A computer program product embodied on a non-transitory computer readable medium and comprising a program code which, when executed on a computer, executes the method according to claim 6.

8. The method as claimed in claim 1, wherein the condition of the brake is monitored at determined time intervals.

9. A computer program product embodied on a non-transitory computer readable medium and comprising a program code which, when executed on a computer, executes the method according to claim 8.

10. The method as claimed in claim 1, wherein the condition of the brake is monitored remote-controllably.

11. The method as claimed in claim 1, wherein the condition of the brake is monitored next during measurement time, which is determined from one or more previously performed brake condition monitorings in which the clearance has been determined.

12. A computer program product embodied on a non-transitory computer readable medium and comprising a program code which, when executed on a computer, executes the method according to claim 11.

13. An apparatus comprising:
a device;
a brake operationally coupled by gear engagement to an axle thereof, whereby turning on the brake prevents the axle from rotating; and
a control connected to the brake, the brake being controlled by the control; and
an encoder, which is a pulse sensor, being an incremental sensor, the incremental sensor being coupled to the axle and a frame of the encoder being fastened to a motor frame,
wherein the device is configured for providing the method according to claim 1.

14. The apparatus as claimed in claim 13, wherein the incremental sensor is arranged to produce information on a change in a position angle of the axle.

15. The apparatus as claimed in claim 14, wherein the incremental sensor is double-channel and a change in the direction of the axle is determined if sequential pulse edges are received from one channel during the time between which no single pulse edge is received in the other channel.

16. The apparatus as claimed in claim 13, which is a crane comprising a hoisting device having the brake coupled to the axle thereof.

17. The apparatus as claimed in claim 13, wherein the control is a frequency control.

18. A computer program product embodied on a non-transitory computer readable medium and comprising a program code which, when executed on a computer, executes the method according to claim 1.

19. The method as claimed in claim 1, wherein the control is a frequency control.

* * * * *